US012191586B2

(12) United States Patent
Eremin et al.

(10) Patent No.: US 12,191,586 B2
(45) Date of Patent: Jan. 7, 2025

(54) ELECTRIC DEVICE WITH A CONTACTING DEVICE FOR A RELEASABLE CONNECTION OF BUS SECTIONS

(71) Applicant: Phoenix Contact GmbH & Co. KG, Blomberg (DE)

(72) Inventors: Sergej Eremin, Herford (DE); Stefan Pollert, Espelkamp (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 254 days.

(21) Appl. No.: 17/790,742

(22) PCT Filed: Jan. 8, 2021

(86) PCT No.: PCT/EP2021/050247
§ 371 (c)(1),
(2) Date: Jul. 18, 2022

(87) PCT Pub. No.: WO2021/140185
PCT Pub. Date: Jul. 15, 2021

(65) Prior Publication Data

US 2023/0052486 A1 Feb. 16, 2023

(30) Foreign Application Priority Data

Jan. 9, 2020 (DE) ..................... 10 2020 100 337.4
May 6, 2020 (DE) ..................... 10 2020 112 254.3

(51) Int. Cl.
*H01R 9/24* (2006.01)
*H01R 4/48* (2006.01)
*H01R 12/51* (2011.01)

(52) U.S. Cl.
CPC ......... *H01R 9/2433* (2013.01); *H01R 4/4846* (2023.08); *H01R 12/515* (2013.01);
(Continued)

(58) Field of Classification Search
CPC . H01R 4/48185; H01R 9/2433; H01R 12/515
See application file for complete search history.

(56) References Cited

U.S. PATENT DOCUMENTS 5,533,907 A 7/1996 Kozel et al.
2003/0194918 A1 10/2003 Fricke et al.
(Continued)

FOREIGN PATENT DOCUMENTS

AU 2010311180 A1 * 6/2012 ............ H01R 24/60
CH 688295 A5 7/1997
(Continued)

*Primary Examiner* — Jean F Duverne
(74) *Attorney, Agent, or Firm* — LEYDIG, VOIT & MAYER LTD.

(57) ABSTRACT

An electrical device arrangeable in a row with other electrical devices includes: a first bus section contactable with a further electrical device arranged on a first side of the electrical device; a second bus section contactable with a further electrical device arranged on a second side of the electrical device facing away from the first side; and a contact device, to which an electrical assembly is connectable, and which includes a contact element for establishing an electrical connection between the first bus section and the second bus section when the contact device is not connected to the electrical assembly, and, when the contact device is connected to the electrical assembly, is displaced in order to disconnect the first bus section and the second bus section from one another.

15 Claims, 5 Drawing Sheets

(52) U.S. Cl.
CPC ............ *H01R 4/4821* (2023.08); *H01R 4/483* (2023.08); *H01R 4/4848* (2023.08)

(56) References Cited

U.S. PATENT DOCUMENTS

| | | | | |
|---|---|---|---|---|
| 2015/0079853 | A1* | 3/2015 | Tsai | H01R 12/73 439/751 |
| 2016/0190750 | A1 | 6/2016 | Shinmi | |
| 2019/0157780 | A1 | 5/2019 | Lueckemeier et al. | |

FOREIGN PATENT DOCUMENTS

| | | | | | |
|---|---|---|---|---|---|
| CN | 204349135 | U * | 5/2015 | B22F 1/0018 |
| DE | 102016111565 | A1 | 12/2017 | |
| EP | 1353407 | A1 | 10/2003 | |
| EP | 1368862 | B1 | 8/2005 | |
| WO | WO-2009141084 | A1 * | 11/2009 | H01R 4/4827 |
| WO | WO 2019049533 | A1 | 3/2019 | |

* cited by examiner

ELECTRIC DEVICE WITH A CONTACTING DEVICE FOR A RELEASABLE CONNECTION OF BUS SECTIONS

CROSS-REFERENCE TO PRIOR APPLICATIONS

This application is a U.S. National Phase application under 35 U.S.C. § 371 of International Application No. PCT/EP2021/050247, filed on Jan. 8, 2021, and claims benefit to German Patent Application No. DE 10 2020 100 337.4, filed on Jan. 9, 2020, and German Patent Application No. DE 10 2020 112 254.3, filed on May 6, 2020. The International Application was published in German on Jul. 15, 2021 as WO/2021/140185 under PCT Article 21(2).

FIELD

The invention relates to an electrical device as described herein and to an assembly comprising such an electrical device.

BACKGROUND

Such an electrical device can be combined with other electrical devices to form an assembly and can be arranged in a row along a row direction. By means of such an electrical device, for example in the form of a so-called bus terminal, an arrangement of electrical devices, for example, on a mounting rail within a switchgear cabinet can be created, by means of which electrical and/or electronic functions can be provided, for example, for creating an input and output system (a so-called I/O system) or for creating a potential distribution.

Such an electrical device comprises a first bus section which can be contacted with a further electrical device arranged on a first side of the electrical device, and a second bus section which can be contacted with a further electrical device arranged on a second side of the electrical device facing away from the first side.

To create an assembly, a plurality of electrical devices can be arranged in a row along a row direction, for example on a mounting rail. In this case, bus sections of the individual electrical devices make contact with each other, so that a continuous bus line (also referred to as a terminal bus) extending over the electrical devices is created, via which, for example, a supply voltage can be distributed over the electrical devices. Such a supply voltage can be fed in, for example, via an input device (also referred to as a bus coupler) and distributed over a bus line created by the devices.

Different bus lines can thereby be created in order to provide, for example, a supply voltage for supplying the electrical devices themselves and additionally a supply voltage for the electrical supply of peripheral devices to be connected to the electrical devices, for example sensors or actuators.

The power demand on a bus line to which, for example, a supply voltage is connected depends on the number of devices connected to the bus line. The power demand on a bus line which serves to supply the electrical devices themselves can be, for example, dependent on the number of electrical devices arranged in a row with one another. The power demand on a bus line which serves to supply peripheral devices connected to the electrical devices depends on the number of peripheral devices connected to the electrical devices, for example sensors or actuators, and their properties.

A bus line usually has a nominally limited maximum current-carrying capacity, which must not be exceeded. For this reason, it is conventionally necessary to provide between electrical devices separate feed modules, at which a supply voltage is fed into an adjacent bus line, so that separate bus lines are created with in each case a separate feed-in of a supply voltage, thereby reducing the power demand on the individual bus lines. A bus line therefore does not extend across all the electrical devices which are arranged in a row with each other, but rather is split into different line sections, at which in each case a supply voltage is fed in.

However, the provision of such separate feeder modules increases the installation space requirement and in addition also the costs.

Contact devices for connecting electrical conductors to connection devices are known in different designs, for example in the form of so-called spring-force terminals. Exemplary embodiments of such spring-force terminals are described, for example, in EP 1 368 862 A2, WO 2019/049533 A1 and EP 1 353 407 A1.

SUMMARY

In an embodiment, the present invention provides an electrical device arrangeable in a row with other electrical devices, comprising: a first bus section contactable with a further electrical device arranged on a first side of the electrical device; a second bus section contactable with a further electrical device arranged on a second side of the electrical device facing away from the first side; and a contact device, to which an electrical assembly is connectable, and which comprises a contact element configured to establish an electrical connection between the first bus section and the second bus section when the contact device is not connected to the electrical assembly, and, when the contact device is connected to the electrical assembly, is displaced in order to disconnect the first bus section and the second bus section from one another.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
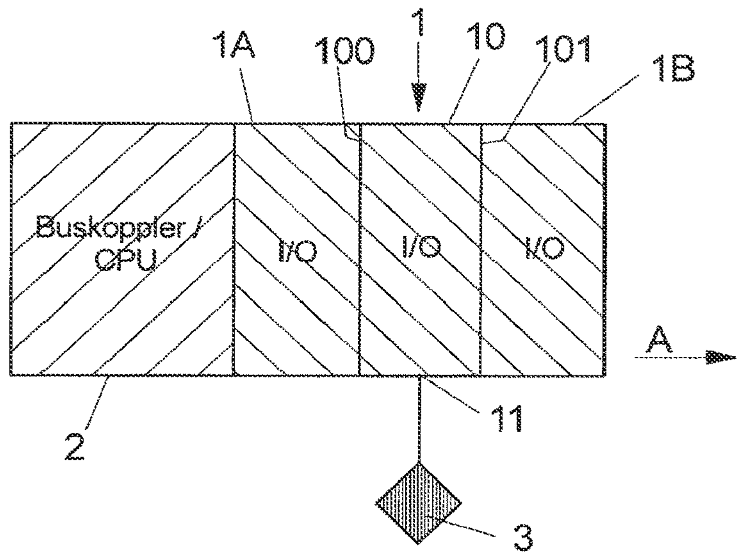
FIG. 1 is a view of an assembly comprising a plurality of electrical devices which are placed in a row with one another along an alignment direction.

In an embodiment, the present invention provides an electrical device and an assembly of electrical devices which enable in a simple and convenient to handle manner the provision of a bus system at electrical devices arranged in a row with one another.

Accordingly, the electrical device has a contact device to which an electrical assembly can be connected and which has a contact element which, when the contact device is not connected to the electrical assembly, establishes an electrical connection between the first bus section and the second section and when the contact device is connected to the electrical assembly is displaced in order to disconnect the first bus section and the second bus section from each other.

Via the contact device, bus sections of the electrical device can be connected to one another or disconnected from one another depending on the situation. Via the contact device, an electrical assembly, for example for providing a supply voltage, can here be connected to the electrical device in order to provide a supply voltage to the electrical device and to distribute it to other electrical devices.

The contact device has different switching states which depend on whether or not an electrical assembly is connected to the electrical device. The electrical assembly is, for example, an electrical line which can be plugged with a contact pin into the contact device and is connected to a higher-level supply unit for providing a supply voltage. Depending on whether the electrical assembly is connected to the contact device, a contact element of the contact device is switched to electrically connect or electrically disconnect the bus sections of the electrical device from one another.

In particular, when the contact device is not connected to the electrical assembly, the contact element can assume a first position in which the bus sections of the electrical device are connected to one another. The bus sections of the electrical device can be contacted with further electrical devices, with which the electrical device is combined and which are arranged in a row on the electrical device, so that via the bus sections a continuous bus can be created over and beyond the electrical devices.

If an electrical assembly is connected to the contact device, the contact element is displaced from the first position into a second position in which the bus sections are electrically disconnected from one another. If an electrical assembly is connected to the contact device, the bus sections will therefore no longer be connected to one another, so that the bus is disconnected at the electrical device and thus at the bus extending over and beyond the electrical devices an electrical separation is created.

The switching of the contact element advantageously takes place automatically during connection of the electrical assembly. If, for example, a contact pin of the electrical assembly is connected to the contact device, the contact element is moved automatically from its first position into the second position, so that an electrical connection between the bus sections of the electrical device is broken and instead the electrical assembly is electrically connected to the second bus section, for example.

Because the contact device is automatically switched when the electrical assembly is connected, this results in comfortable handling for a user who does not need to carry out any further work steps in order to connect a supply voltage to an assembly having a plurality of electrical devices, for example in order to feed electrical devices. Connecting the supply voltage can thus be carried out easily and intuitively with improved safety during operation.

Because a separate feeder/refeeder module is also no longer required, but an electrical device that is present in any case provides the possibility of feeding in a supply voltage, the installation space requirement can be reduced while at the same time reducing the costs.

This makes it possible to feed in a supply voltage at a plurality of locations in an assembly of electrical devices. By separating bus sections, different separate bus lines are here created, to which the supply voltage is applied in each case and into which current is fed from in each case an associated electrical supply unit at one location. The different bus lines are electrically interrupted in this case, so that current paths between different connections for the supply voltage are avoided.

In one development, the contact device, when connected to the electrical assembly, electrically connects the electrical assembly to the second bus section. When the contact device is connected to the electrical assembly, the contact element will thus be in a position in which an electrical assembly connected to the contact device is electrically connected to the second bus section and to a bus line adjoining it. In contrast, the first bus section and a bus line adjoining it are disconnected from the second bus section and possibly connected to a supply voltage at another location.

In one development, the contact element is arranged with resilient springiness on a support element of the contact device. The contact element can, for example, be formed integrally with the support element and can, for example, take the form of a spring leg. The contact element can thus be resiliently deflected and thereby can be displaced between its first position and the second position in order to connect the bus sections of the electrical device to one another in the first position and in the second position to electrically disconnect the bus sections from one another.

The bus sections of the electrical device can be created, for example, by sections of busbars of the electrical device. The bus sections are electrically contactable to associated bus sections of electrical devices that can be arranged in a row so that via the bus sections a continuous bus can be created over and beyond the electrical devices.

In one development, the contact device has an actuating element for actuating the contact element when the electrical assembly is connected to the contact device. The actuating element can, for example, be arranged with resilient springiness on the support element of the contact device and can, for example, take the form of a spring leg. The actuating element can be integrally formed with the support element, but alternatively can also be attached to the support element as a separate element and be permanently connected to the support element.

The actuating element can serve for interacting with a contact pin of the electrical assembly to be connected and for actuating the contact element. When a contact pin is connected, the actuating element is preferably actuated automatically and thereby acts on the contact element so that it is displaced from a first position into the second position and thus an electrical connection between the bus sections of the electrical device is broken. When the electrical assembly is connected, the contact device is thus automatically switched so that the electrical assembly is connected to a bus line, but a further bus line is disconnected.

In one development, the actuating element has a leg section for interacting with a contact pin of the electrical assembly. The leg section can serve, for example, in the manner of a spring-force terminal to press the contact pin in the plugged-in position into an electrically contacting abutment with an abutment section. In the plugged-in position, the contact pin thus enters into an intermediate position between the leg section and the abutment section so that the contact pin contacts the abutment section via the leg section and is thus connected to the contact device.

In one development, the actuating element has an actuating section for interacting with the contact element. The actuating section can, for example, be offset transversely to a plug-in direction, along which the contact pin can be plugged into the contact device, from the leg section, so that the actuating element can act on the contact element via the actuating section when the contact pin of the electrical assembly is plugged into the contact device. At an end facing the contact element, the actuating section can be curved, for example, so that the actuating section can come into abutment with the contact element, for example in the form of a spring leg, in an advantageous, low-wear manner, in order to deflect the contact element and thereby displace it between different positions. As a result of the fact that the actuating section is arranged spatially next to the leg section for interacting with the contact pin of the electrical assembly, the contact pin can be plugged into the contact device without itself interacting with the contact element, while deflecting the actuating element and thereby actuating the contact element.

In another development, the contact element is formed on the leg section and is thus formed integrally with the leg section. The contact element is thus part of the actuating element and upon the actuating element being moved is moved together with the leg section of the actuating element. If a contact pin, for example in the form of a connection end of an electrical line, acts on the leg section and displaces it, the contact element will be displaced together with the leg section and the first bus section will thus be electrically disconnected from the second bus section.

The contact element can be formed, for example, on a free end of the leg section. The actuating element is connected, for example, via a support section to a support element of the contact device, for example by attaching the actuating element to the support element and supporting it on the support element or by forming the actuating element in one piece and integrally with the support element. The leg section is resiliently deflectable to the support section, wherein the contact element is formed on a free end of the leg section that is remote from the support section and is thus moved together with the leg section when the leg section is deflected.

In one development, the contact element in its first position, which is associated with the state when the contact device is not connected to the electrical assembly, rests on a counter-contact in order to establish in this way an electrical connection between the first bus section and the second bus section. In this case, the contact element is connected to one of the bus sections and the counter-contact is connected to the other of the bus sections, so that, when the contact element electrically contacts the counter-contact, an electrical connection is established between the bus sections.

In one development, the contact element takes the form of a sliding contact, which in an electrically contacting position makes sliding contact with an associated counter-contact. If the leg section of the actuating element is (resiliently) deflectable about a pivot axis, the contact element will be able, for example, to make sliding electrical contact with a surface section of the counter-contact directed perpendicular to the pivot axis, wherein, when the leg section moves, the contact element is moved tangentially on the surface section of the counter-contact and thus slides along the surface section.

An assembly preferably comprises a plurality of electrical devices. The electrical devices can be structurally identical and, for example, can be designed as terminals, for example in the form of terminal blocks (also referred to as bus terminals). However, the electrical devices can also be designed differently from one another.

In this case, an electrical device can be arranged in a row with further electrical devices in order to create the assembly. Each electrical device has bus sections which, when the electrical devices are placed in a row with each other, make electrical contact with one another and thus provide a continuous bus line. At least one of the electrical devices has a contact device of the type described above, via which an electrical assembly, for example for feeding/refeeding a supply voltage, can be connected to the assembly and enables the bus line to be disconnected at the electrical devices.

The assembly of the electrical devices can additionally be connected to an input device (also referred to as a bus coupler) via which a supply voltage can be fed in and which, moreover, can have an electronics unit, for example comprising a processor, for control functions.

Within the framework of an assembly, electrical devices 1, 1A, 1B can be placed in a row with one another, for example, on a mounting rail along a row direction A in order to provide an electrical system by combining the electrical devices 1, 1A, 1B, which electrical system can, for example, take over input and output functions or potential distribution functions. Such an assembly can be arranged, for example, in a control cabinet, wherein each electrical device 1, 1A, 1B can have one or more connections 11 for connecting peripheral devices 3, for example in the form of sensors or actuators.

An electrical device 1 has, for example, a substantially flat housing 10 which forms side walls 100, 101 extending parallel to one another. At these side walls 100, 101 further electrical devices 1A, 1B can be placed to form a row with the electrical device 1, in order in this way to create an assembly with a plurality of electrical devices 1, 1A, 1B arranged in a row with one another along the row direction A.

Figure 2:
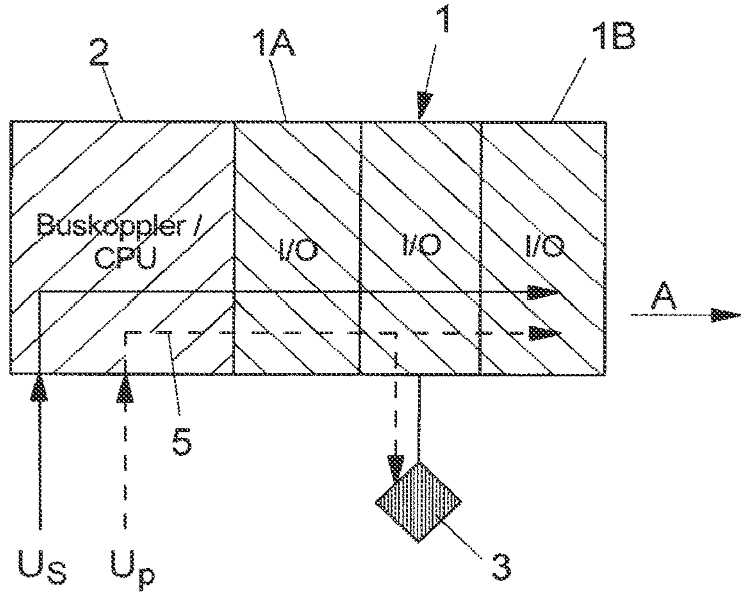
FIG. 2 is a view of the assembly with schematically drawn bus lines for the distribution of supply voltages over the electrical devices.

As is schematically illustrated in FIG. 2, such an assembly is usually supplied with a supply voltage via an input device 2, also referred to as a bus coupler. The electrical devices 1, 2 which are arranged in a row with one another are electrically connected to one another for the creation of bus lines 4, 5, wherein a separate supply voltage $U_S$, $U_P$ can be connected to each bus line 4, 5 via the input device 2. In this case, a supply voltage $U_S$ can serve, for example, for supplying the electrical devices 1, 2 themselves. In contrast, a different supply voltage $U_P$ can serve, for example, for supplying peripheral devices 3 connected to the electrical devices 1.

Each bus line 4, 5 usually has a nominally limited, maximum current-carrying capacity. Because the current requirement (i.e. the current intensity to be provided) depends on the number of electrical devices 1 and/or on the number and kind of peripheral devices 3 to be connected to the electrical devices 1, it may be necessary, particularly at the bus line 5 for supplying the peripheral devices 3, to feed in the supply voltage $U_P$ multiple times in order to limit the current intensity at individual sections of the bus line 5.

Figure 3:
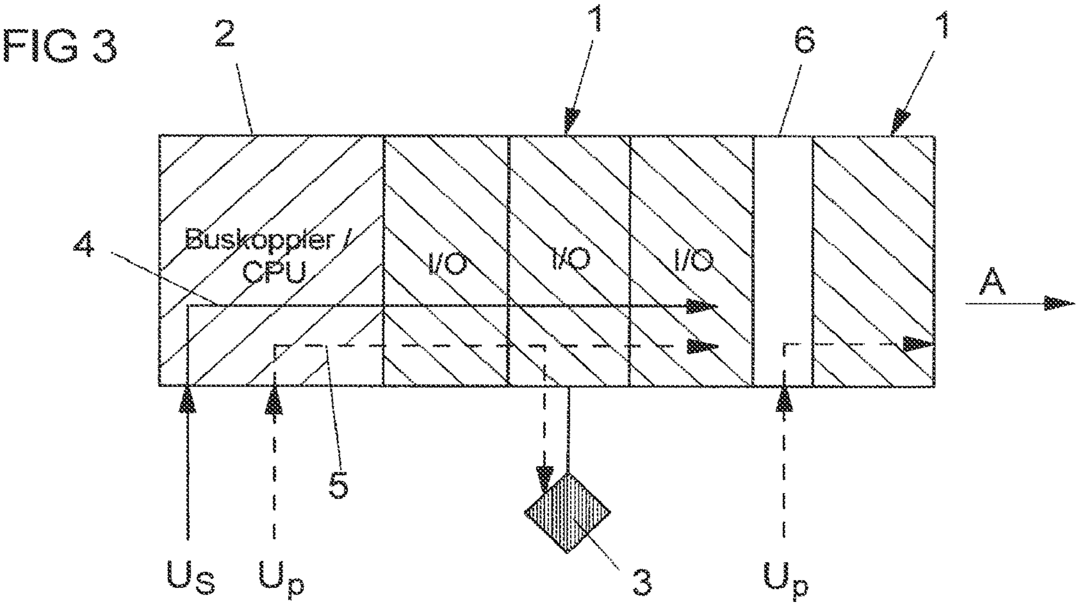
FIG. 3 is a view of an assembly according to the prior art, with a feeder/refeeder module for feeding in a supply voltage.

For this purpose, as is shown in FIG. 3, so-called feeder/refeeder modules 6 are conventionally used, which are arranged between the electrical devices 1 which are arranged in a row with one another and have a terminal for connecting the supply voltage $U_P$. Separate bus lines can thus be supplied individually and separately from one another via such feeder/refeeder modules 6, so that only a limited current intensity occurs on the individual bus lines.

However, such feeder/refeeder modules 6 increase the installation space requirement and, in addition, also the costs. For this reason, it is proposed in the present case to completely or partially dispense with such feeder/refeeder modules 6, and instead to provide a contact device on one or more electrical devices 1, which contact device enables a connection of an electrical assembly, in particular for providing a supply voltage $U_P$, and which is switchable in order to close a bus line at electrical devices 1 arranged in a row with one another (if no electrical assembly is connected to the contact device) or to open the same (if an electrical assembly is connected to the contact device).

Figure 4:
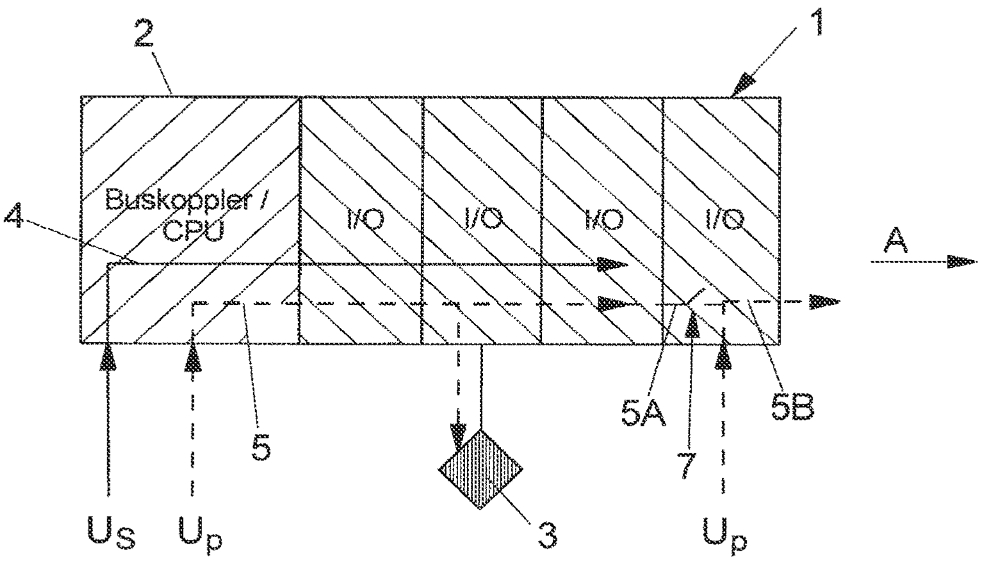
FIG. 4 is a view of an assembly with electrical devices, of which at least one has a contact device for feeding in a supply voltage.

In an exemplary embodiment illustrated in FIG. 4, an electrical device 1 has a contact device 7, which is functionally arranged in the bus line 5 and serves to connect a supply voltage $U_P$ to the bus line 5. The bus line 5 extends in principle over and beyond the electrical devices 1, 1A, 2 which are connected to one another, wherein each electrical device 1, 1A, 2 has bus sections 5A, 5B, which contact one another when the electrical devices 1, 1A, 2 are arranged in a row with one another and thus produce a continuous bus line 5. By connecting a peripheral device 3 to an electrical device 1, 1A, the peripheral device 3 can be connected to the bus line 5, so that an electrical supply for the peripheral device 3 can be provided via the bus line 5.

In the exemplary embodiment according to FIG. 4, the contact device 7 acts between two bus sections 5A, 5B of an electrical device 1. In principle, each electrical device 1, 1A of the electrical assembly can have such a contact device 7. However, it is also conceivable for only one or some of the electrical devices 1, 1A to have such a contact device 7.

Figure 5:
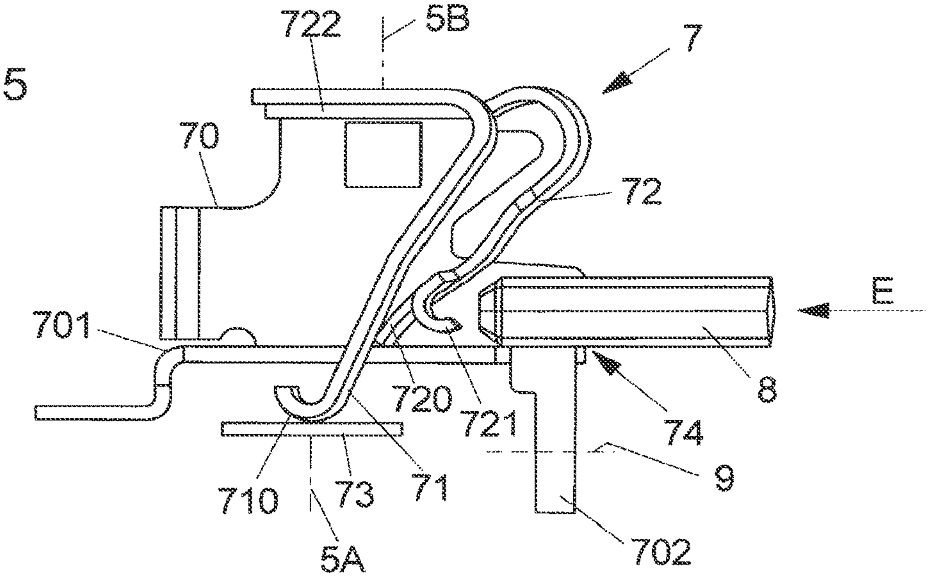
FIG. 5 is a view of an exemplary embodiment of a contact device in a first position of a contact element in which bus sections of an associated electrical device are electrically connected to one another.
Figure 6:
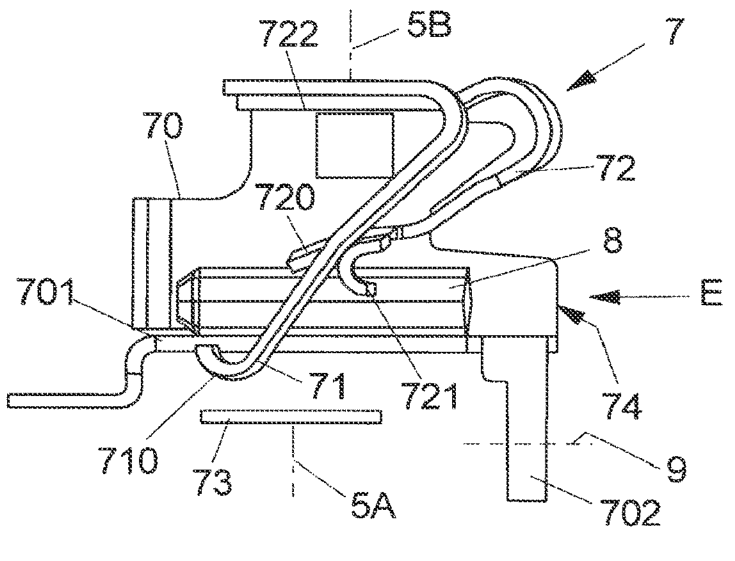
FIG. 6 is the view according to FIG. 5, but in a second position of the contact element with bus sections disconnected from one another.

The contact device 7 is shown in an exemplary embodiment in FIGS. 5 and 6.

The contact device 7 has a support element 70 which, for example, is integrally formed as a punched and bent part made of an electrically conductive metal and is accommodated in the housing 10 of the associated electrical device 1.

A contact element 71 in the form of a spring leg is formed integrally with the support element 70, which contact element serves to establish an electrical connection between bus sections 5A, 5B connected to the contact device 7 (as in the position according to FIG. 5) or to disconnect them (as in the position according to FIG. 6).

The contact element 71 rests in a first position, shown in FIG. 5, with one end 710 on a contact section of a counter-contact 73. In this case, bus sections 5A, 5B are connected electrically on the one hand to the support element 70 and on the other hand to the counter-contact 73, so that an electrical connection between the bus sections 5A, 5B is established in this first position of the contact element 71.

The contact element 71 can be deflected out of the first position, as is shown in the transition from FIG. 5 to FIG. 6. In a second position shown in FIG. 6, the contact element 71 no longer rests with its end 710 on the counter-contact 73 with the result that the bus sections 5A, 5B are electrically disconnected from one another.

The contact device 7 has an actuating element 72 which is fastened to the support element 70 via a support section 722 and forms a spring leg which extends into the region of a plug-in opening 74 formed on the support element 70. A contact pin 8 of an electrical assembly to be connected to the contact device 7, for example a line connected to a supply unit, can be inserted into the plug-in opening 74 along a plug-in direction E in order to connect the contact pin 8 to the contact device 7.

When plugged in, the contact pin 8 acts on a leg section 720 at one end of the actuating element 72 that is remote from the support section 722 so that the actuating element 72 is thereby deflected out of the initial position shown in FIG. 5. In the plugged-in position of the contact pin 8, the contact pin 8 comes to lie between the leg section 720 and an abutment section 701 of the support element 70 so that the contact pin 8 is pretensioned in a spring-elastic manner towards the abutment section 701 via the leg section 720 and is thereby brought into electrically contacting abutment with the abutment section 701.

An actuating section 721, which serves for interacting with the contact element 71, is formed on the actuating element 72 transversely to the plug-in direction E and offset to the leg section 720. When the contact pin 8 is inserted and when the actuating element 72 is deflected, the actuating section 721 acts on the contact element 71 and brings it out of the first position according to FIG. 5 into the second position according to FIG. 6 so that when the contact pin 8 is inserted, the electrical connection, created via the contact element 71, between the bus sections 5A, 5B is automatically broken and the bus sections 5A, 5B are thereby electrically disconnected from one another.

If the contact pin 8 is again removed from the plug-in opening 74 counter to the plug-in direction E, the contact element 71 and the actuating element 72 return to the initial position according to FIG. 5 due to their spring-mechanical tension so that an electrical connection between the bus sections 5A, 5B is reestablished.

FIGS. 7 to 13 show views of a further exemplary embodiment of a contact device 7, which serves to electrically connect two bus sections 5A, 5B, as has been explained above on the basis of FIGS. 1 to 4.

Figure 11:
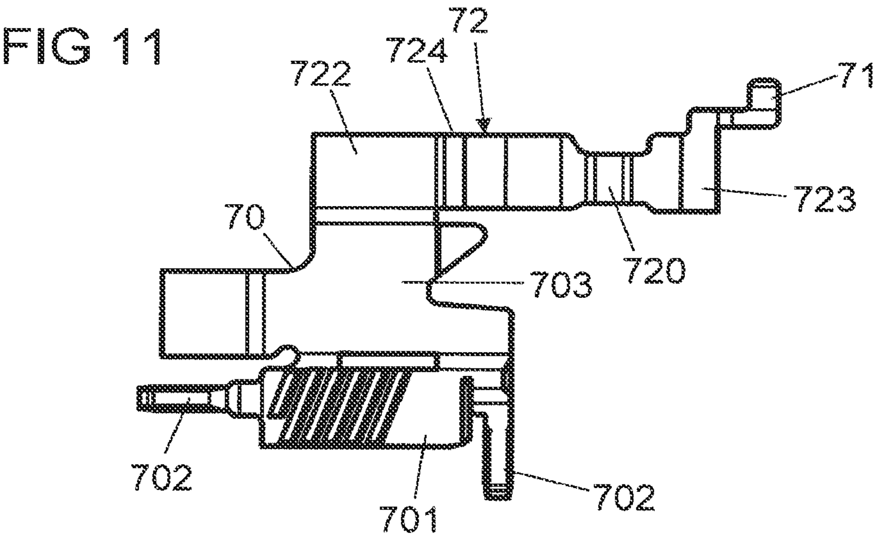
FIG. 11 is a view of a molded part of the contact device, which is produced as a punched part, before the molded part is bent to form the contact device.
Figure 12:
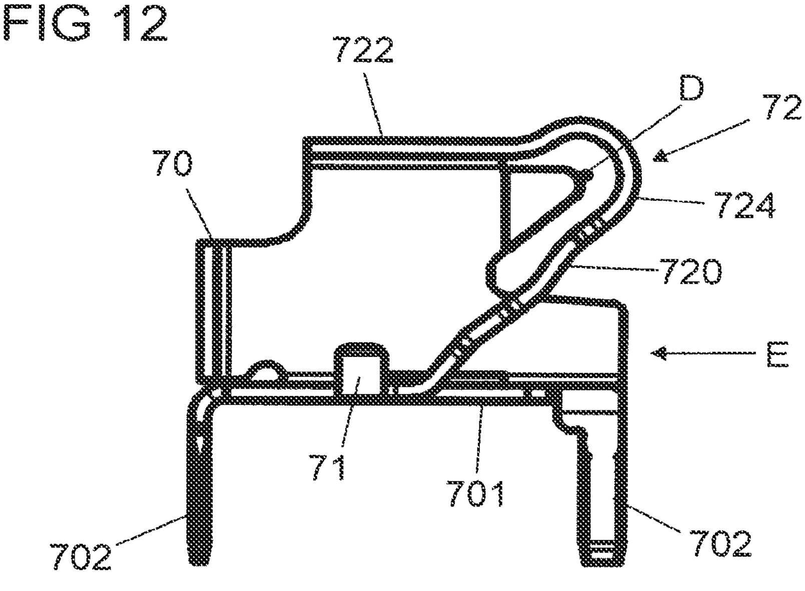
FIG. 12 is a view of the molded part according to FIG. 11 after bending to form the contact device.
Figure 13:
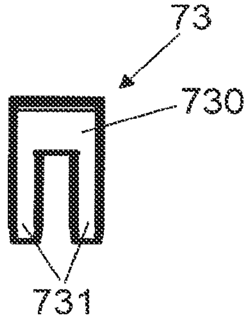
FIG. 13 is a separate view of a counter-contact in the form of a sliding contact.

In the exemplary embodiment shown in FIGS. 7 to 13, the contact device 7 has a support element 70, with which an actuating element 72 and an abutment section 701 are integrally formed as one piece. The support element 70 is formed as a punched bent part which is punched out of a piece of sheet metal, as can be seen in FIG. 11, and bent after punching, as can be seen in the transition from FIG. 11 to FIG. 12.

The support element 70 forms a wall section 703 at which a support section 722 of the actuating element 72 is bent approximately at right angles. A leg section 720 is connected to the support section 722, via a curved section 724 extending about a pivot axis D, such that the leg section 720 is resiliently deflectable about the pivot axis D under flexible bending at the curved section 724.

Facing away from the support section 722, the abutment section 701 is integrally connected to the wall section 703 and extends approximately at right angles to the wall section 703. Connecting legs 702, via which the support element 70 is connected to a printed circuit board 9 of an electrical device 1, project relative to the abutment section 701.

A contact element 71 is formed on a free end 723 of the leg section 720, which contact element extends approximately parallel to the wall section 703 of the support element 70 and is moved together with the leg section 720 when the leg section 720 is displaced.

Figure 7:
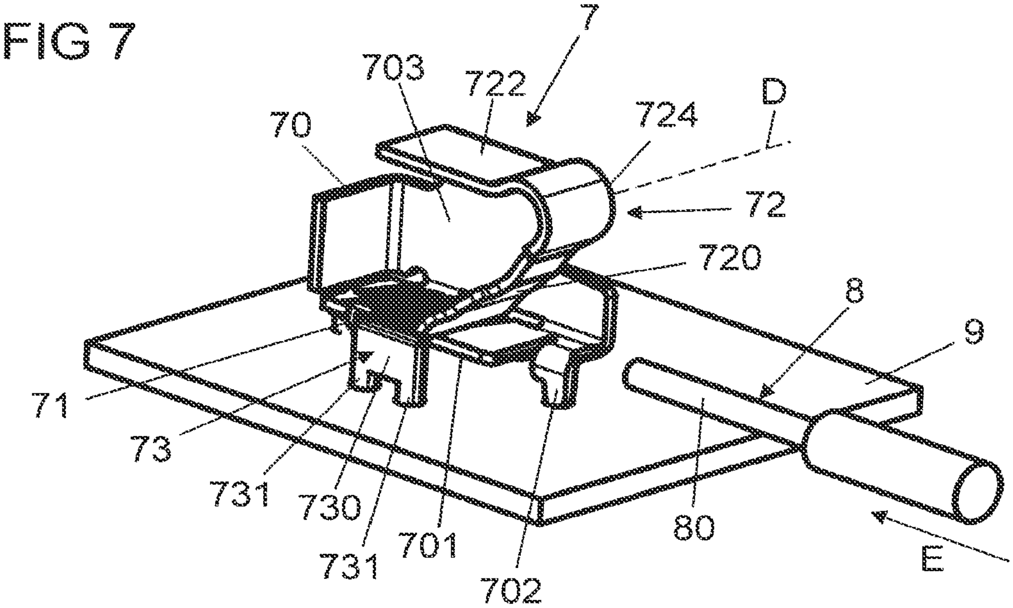
FIG. 7 is a view of another exemplary embodiment of a contact device in a first position of a contact element in which bus sections of an associated electrical device are electrically connected to one another.
Figure 8:
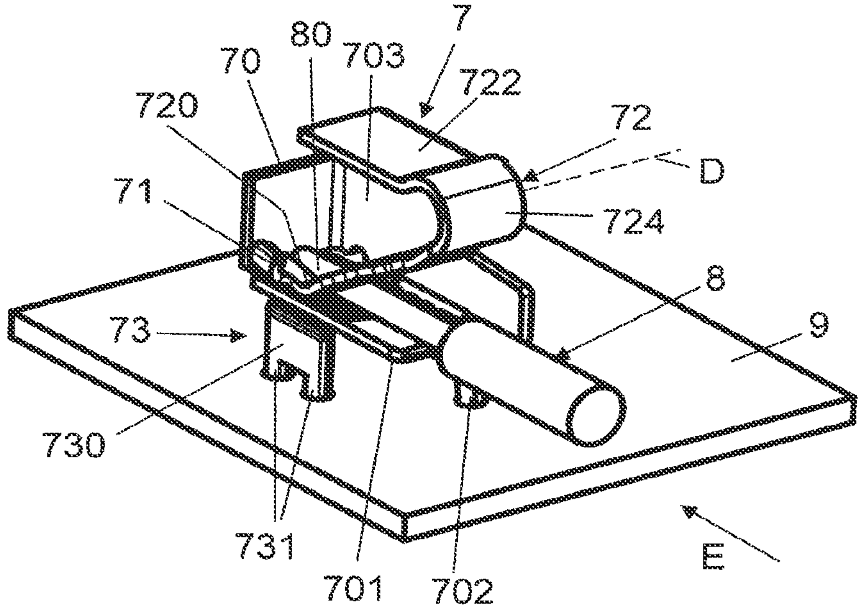
FIG. 8 is a view of the contact device according to FIG. 7, in a second position of the contact element, when bus sections are disconnected from one another.
Figure 9:
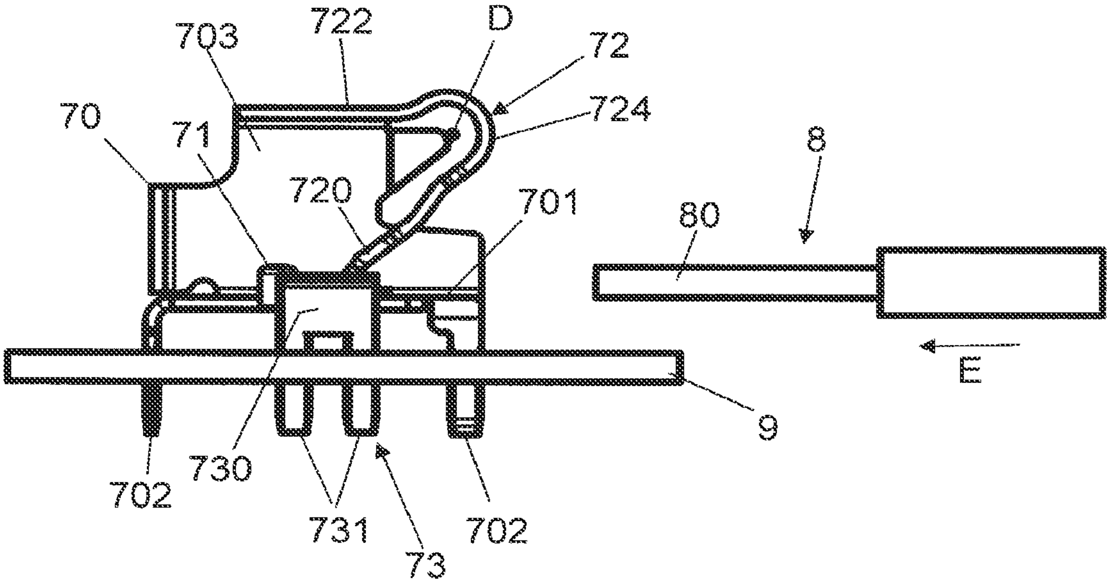
FIG. 9 is a side view of the arrangement according to FIG. 7.
Figure 10:
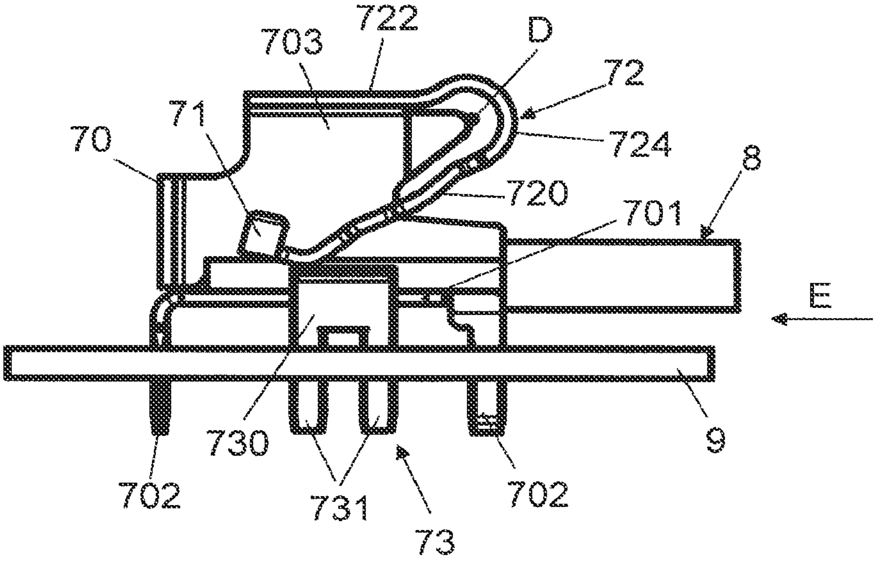
FIG. 10 is a side view of the arrangement according to FIG. 8.

The contact element 71 forms a sliding contact which serves for sliding contact with a counter-contact 73 which has a surface section 730 and connecting legs 731 formed on the surface section 730, via which the counter-contact 73 is arranged on the printed circuit board 9, as can be seen, for example, from FIGS. 7 and 8.

The contact element 71 is designed for sliding contact with the surface section 730 of the counter-contact 73. In a first position of the contact element 71, in which no contact pin 8, for example a connection end 80 of an electrical line, is connected to the contact device 7, the leg section 720 rests with its free end 723 against the abutment section 701 of the support element 70, as can be seen from FIGS. 7 and 9 in conjunction with FIG. 12. In this position of the leg section 720, the contact element 71 at the free end 723 of the leg section 720 contacts the surface section 730 of the counter-contact 73 by the contact element 71 being in flat abutment with the surface section 730.

If a contact pin 8, for example in the form of a connection end 80 of an electrical line, is plugged into the contact device 7 in a plug-in direction E and the contact pin 8 interacts with the leg section 720, the leg section 720 will be resiliently deflected. The contact pin 8 is thus pushed between the free end 723 of the leg section 720 and the abutment section 701, as can be seen from FIG. 8.

By the pivoting of the leg section 720, the contact element 71 formed on the free end 723 is moved tangentially to the surface section 730 of the counter-contact 73 and pushed tangentially away from the surface section 730 so that the contact between the contact element 71 and the counter-contact 73 is broken. The movement of the contact element 71 relative to the surface section 730 here takes place in a sliding manner, wherein the contact element 71 moves in a plane perpendicular to the pivot axis D to which the surface section 730 extends in parallel.

If a contact pin 8 is plugged into the contact device 7, the contact between the contact element 71 and the counter-contact 73 will thus be broken. Bus sections 1A, 1B connected to the contact element 71 and the counter-contact 73 are thus electrically disconnected from one another.

Here the contact pin 8 is mechanically latched to the contact device 7 via the leg section 720 and is additionally electrically connected to the contact device 7 by the leg section 720 resiliently pressing the contact pin 8 into abutment with the abutment section 701.

By means of a contact device 7, as has been described above with reference to FIGS. 5 and 6 and with reference to FIGS. 7 to 13, the connection of an electrical assembly, in particular a supply unit for providing a supply voltage $U_P$, to an electrical device 1 is made possible. When the electrical assembly is connected, a (previously continuous) bus line is automatically opened and the electrical assembly is connected to a bus section, namely to the bus section 5B connected to the support element 70, so that the electrical assembly is connected to the bus line adjoining the bus section 5B.

A bus line adjoining the other bus section 5A is, in contrast, disconnected, so that the supply voltage $U_P$ is fed via the contact device 7 only into the bus line associated with the bus section 5B.

The connection of an additional supply voltage $U_P$ for feeding/refeeding of the supply voltage $U_P$ can thus take place at an electrical device 1. A separate feeder/refeeder module 6 (as in the arrangement according to FIG. 3) is not required, so that installation space and costs can be saved.

In principle, all electrical devices 1, 1A can have such a contact device 7, so that at all electrical devices 1, 1A the connection of an additional supply voltage $U_P$ is made possible. However, it is also conceivable and possible for such a contact device 7 to be present only on individual electrical devices 1.

Because the disconnection of the electrical connection between bus sections 5A, 5B takes place automatically when an electrical assembly, in particular an electrical supply unit for providing a supply voltage $U_P$, is connected, no further working steps are required for the functionally correct connection of the electrical assembly to a bus line. This simplifies handling and additionally increases the safety of the electrical connection.

The idea behind the invention is not limited to the exemplary embodiments described above but can also be implemented in another manner.

Electrical devices which can be arranged in a row with one another can be of very different designs and can, for example, take the form of input and output devices for connecting peripheral devices, for example in the form of actuators or sensors, to an assembly. However, electrical devices can also be designed, for example, as terminal devices, for example in the form of terminal blocks for a potential distribution, but entirely different designs of electrical devices are also conceivable and possible.

Such electrical devices can, for example, be combined with one another on a mounting rail and arranged in a row with one another. In this way, electrical devices can, for example, be mounted in a control cabinet in a flexibly combinable manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1, 1A, 1B Electrical device (bus terminal)
10 Housing
100, 101 Side
11 Connection
2 Input device (bus coupler)
3 Peripheral device (sensor/actuator)
4, 5 Bus line (terminal bus)
5A, 5B Bus section
6 Feeder module
7 Contact device
70 Support element
700 Plug-in opening
701 Abutment section
702 Connecting leg
703 Wall section
71 Contact element
710 End
72 Actuating element
720 Leg section
721 Actuating section
722 Support section
723 End
724 Curved section
73 Counter-contact
730 Surface section
731 Connecting leg
74 Plug-in opening
8 Contact pin
80 Connection end
9 Printed circuit board
A Row direction
D Pivot axis
E Plug-in direction
$U_S$, $U_P$ Supply voltage

The invention claimed is:

1. An electrical device arrangeable in a row with other electrical devices, comprising:
a first bus section contactable with a further electrical device arranged on a first side of the electrical device;
a second bus section contactable with a further electrical device arranged on a second side of the electrical device facing away from the first side; and
a contact device, to which an electrical assembly is connectable, and which comprises a contact element configured to establish an electrical connection between the first bus section and the second bus section when the contact device is not connected to the electrical assembly, and, when the contact device is connected to the electrical assembly, is displaced in order to electrically disconnect the first bus section and the second bus section from one another.

2. The electrical device of claim 1, wherein the electrical assembly is connectable to the contact device to provide a supply voltage.

3. The electrical device of claim 1, wherein the contact element, when the contact device is not connected to the electrical assembly, assumes a first position and, when the contact device is connected to the electrical assembly, assumes a second position, and
wherein the contact element is displaceable from the first position into the second position by connecting the electrical assembly.

4. The electrical device of claim 1, wherein the contact device, when connected to the electrical assembly, electrically connects the electrical assembly to the second bus section.

5. The electrical device of claim 1, wherein the contact element is arranged with resilient springiness on a support element of the contact device.

6. The electrical device of claim 1, wherein the contact element comprises a spring leg.

7. The electrical device of claim 1, wherein the contact device has an actuating element configured to actuate the contact element when the electrical assembly is connected to the contact device.

8. The electrical device of claim 7, wherein the actuating element is arranged with resilient springiness on a support element of the contact device.

9. The electrical device of claim 7, wherein the actuating element comprises a spring leg.

10. The electrical device of claim 7, wherein the actuating element has a leg section configured to interact with a contact pin of the electrical assembly.

11. The electrical device of claim 10, wherein the leg section is configured to press the contact pin in the plugged-in position into an electrically contacting abutment with an abutment section.

12. The electrical device of claim 10, wherein the actuating element has an actuating section configured to interact with the contact element, and wherein the actuating section is offset transversely to a plug-in direction, along which the contact pin is pluggable into the contact device, from the leg section.

13. The electrical device of claim 10, wherein the contact element is formed on the leg section.

14. The electrical device of claim 10, wherein the contact element comprises a sliding contact configured to contact a counter-contact by sliding, and
wherein the leg section is deflectable about a pivot axis and the counter-contact has a surface section, which is oriented perpendicular to the pivot axis, so as to contact the contact element.

15. An assembly, comprising:
the electrical device of claim 1; and
at least one further electrical device arrangeable in a row with the electrical device.

* * * * *